United States Patent [19]

Stewart et al.

[11] 4,349,969  
[45] Sep. 21, 1982

[54] FLUIDIZED BED REACTOR UTILIZING ZONAL FLUIDIZATION AND ANTI-MOUNDING PIPES

[75] Inventors: Robert D. Stewart, Verona; Robert L. Gamble, Wayne, both of N.J.

[73] Assignee: Foster Wheeler Energy Corporation, Livingston, N.J.

[21] Appl. No.: 300,877

[22] Filed: Sep. 11, 1981

[51] Int. Cl.³ .................... F26B 17/00; F22B 1/02
[52] U.S. Cl. .................... 34/57 A; 122/4 D; 110/245; 432/58; 34/102
[58] Field of Search .............. 122/4 D; 110/245; 432/58; 34/57 A, 102

[56] References Cited

U.S. PATENT DOCUMENTS

| | | | |
|---|---|---|---|
| 3,397,657 | 8/1968 | Tada | 110/245 |
| 3,881,857 | 5/1975 | Hoy et al. | |
| 4,177,742 | 12/1979 | Uemura et al. | 110/245 |
| 4,184,438 | 1/1980 | Bryers et al. | 122/4 D |
| 4,184,455 | 1/1980 | Tolmud et al. | 122/4 D |
| 4,196,676 | 4/1980 | Brown et al. | 122/4 D |
| 4,227,488 | 10/1980 | Stewart et al. | 110/245 |
| 4,249,472 | 2/1981 | Mitchell | 110/245 |
| 4,253,425 | 3/1981 | Gamble et al. | 110/245 |
| 4,259,088 | 3/1981 | Moss | 432/58 |
| 4,270,468 | 6/1981 | Robinson et al. | 122/4 D |
| 4,273,073 | 6/1981 | Robinson | 122/4 D |

FOREIGN PATENT DOCUMENTS 1087528 10/1967 United Kingdom ............... 110/245

Primary Examiner—Henry C. Yuen
Attorney, Agent, or Firm—Marvin A. Naigur; John E. Wilson; Warren B. Kice

[57] ABSTRACT

A fluidized bed reactor in which a grate is disposed in a housing for receiving a single bed of particulate material. The interior of the housing below the grate is divided into a plurality of zones and air is selectively passed through portions of the grate to fluidize corresponding portions of the bed above the zones. A plurality of pipes are provided in the bed for receiving excess particulate material accumulating in various portions of the bed and for blowing air into said latter portion, to reduce the build-up of particulate material in the bed.

8 Claims, 1 Drawing Figure

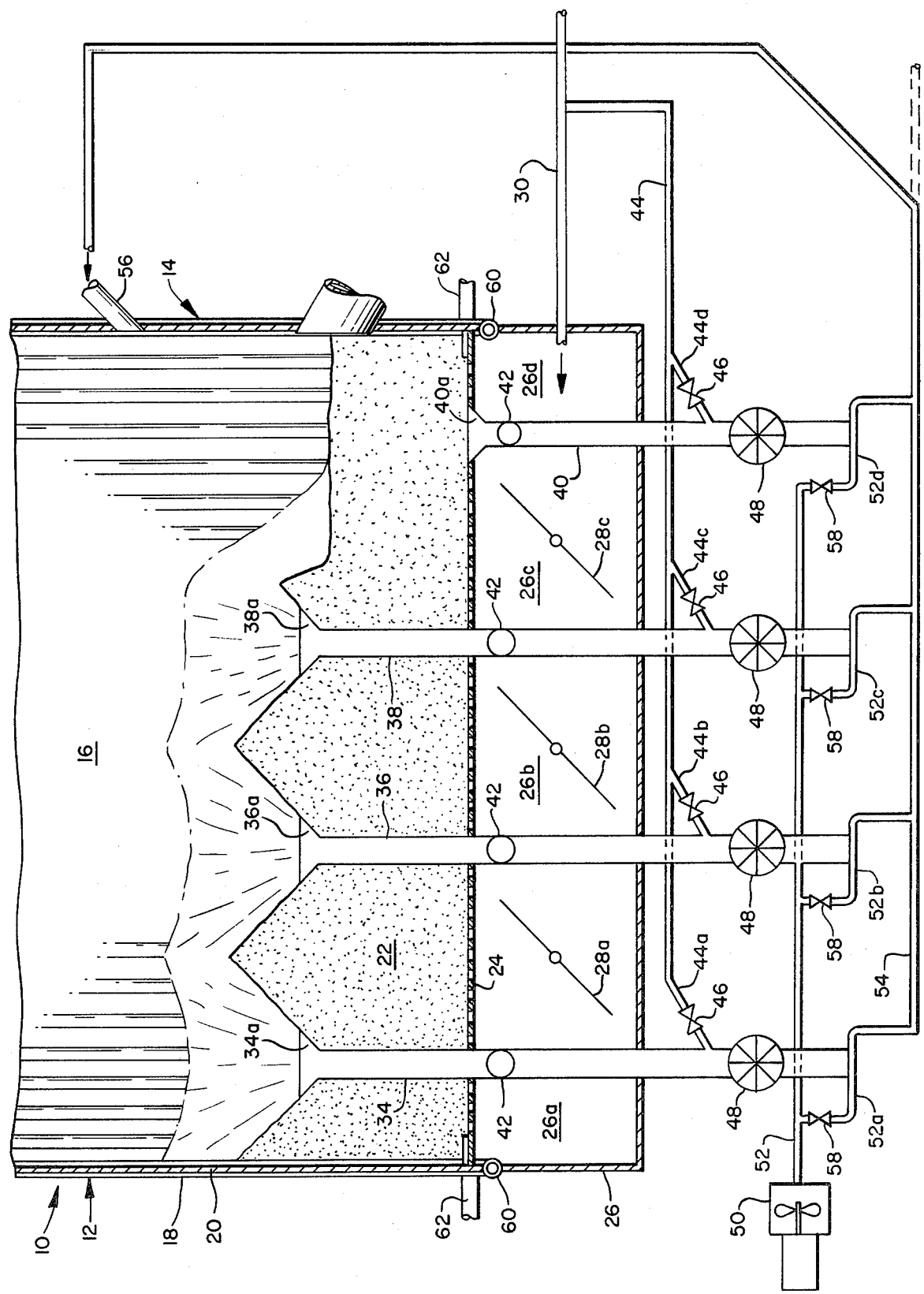

FLUIDIZED BED REACTOR UTILIZING ZONAL FLUIDIZATION AND ANTI-MOUNDING PIPES

BACKGROUND OF THE INVENTION

This invention relates to a fluidized bed reactor and, more particularly, to such a reactor in which heat is generated by the combustion of particulate fuel in a fluidized bed.

Fluidized bed reactors, usually in the form of combustors, boilers, gasifiers, or steam generators, are well known. In a normal fluidized bed arrangement, air is passed through a perforated plate, or grate, which supports a bed of particulate material, usually including a mixture of fuel material, such as high sulfur bituminous coal, and an adsorbent material for the sulfur released as a result of the combustion of the coal. As a result of the air passing through the bed, the bed behaves like a boiling liquid which promotes the combustion of the fuel. In addition to enjoying a high capability for reducing the amount of sulfur in the gases introduced to the atmosphere, such an arrangement permits relatively high heat transfer rates per unit size, substantially uniform bed temperatures, relatively low combustion temperatures and reduction in corrosion and boiler fouling.

In the fluidized bed combustion process, the coal and adsorbent are continuously introduced into the bed by suitable feeders, injectors, or the like and the spent coal and adsorbent are discharged from the lower portion of the bed, usually through a gravity drain pipe extending through a wall of the heat exchanger or through a discharge opening.

In order to optimize operating conditions, the fluidized bed has often been divided into a plurality of zones, usually by selectively introducing the fluidizing air into certain portions of the bed at different times. This enables selected zones to be fluidized while others are dormant to accomodate changing load or start-up conditions.

For example, this selective, or zonal, fluidization simplifies start-up since only a discrete zone of the bed need be preheated to support ignition, which will then readily propogate to adjacent zones as they are brought into service. Also, load control may also be easily achieved by zonal fluidization by increasing or decreasing the number of zones which are fluidized. Further, zonal fluidization enables hot gases to back flow from operating zones through the dormant beds for bed temperature maintenance prior to rapid light-off and ignition of adjacent bed sections.

However, when zonal fluidization is utilized, the area of the bed which is fluidized tends to expand in height above the grid. As a result, the flow of air and the gaseous products of combustion through the fluidized bed causes the particulate materials to tend to build up, or mound, on the unfluidized portion of the bed. This mounting, of course, destroys the parameters under which the bed operates, and can severely effect its efficiency.

SUMMARY OF THE INVENTION

It is therefore an object of the present invention to provide a fluidized bed reactor which utilizes zonal fluidization and yet eliminates any disadvantages normally associated with this technique.

It is a further object of the present invention to provide a fluidized bed reactor of the above type in which mounding of the particulate material on any portion of the bed is eliminated.

It is a further object of the present invention to provide a fluidized bed reactor of the above type in which a plurality of pipes are provided in the bed for eliminating any mounding of particulate material in the bed.

It is a still further object of the present invention to provide a fluidized bed reactor of the above type in which the aforementioned pipes are adapted to collect particulate material building up in the bed and to discharge the material from the bed to prevent the build-up of the material in the bed.

It is a still further object of the present invention to provide a fluidized bed reactor of the above type in which the aforementioned pipes are also adapted to blow air into the bed, also for the purpose of preventing the build-up of the material in the bed.

Toward the fulfillment of these and other objects, the reactor of the present invention includes a grate supported in a housing and adapted to receive a bed of particulate material. A source of air is selectively passed through selected portions of the grate to fluidize the corresponding portions of the bed of particulate material. A plurality of pipes are disposed in the housing for reducing the build-up of the particulate material in one or more of the bed portions.

BRIEF DESCRIPTION OF THE DRAWINGS

The above brief description, as well as futher objects, features and advantages of the present invention will be more fully appreciated by reference to the following detailed description of the presently preferred but nonetheless illustrative embodiment in accordance with the present invention when taken in conjunction with the accompanying drawing which is a vertical sectional view of a portion of a reactor according to the present invention.

DESCRIPTION OF THE PREFERRED EMBODIMENT

Referring to the drawing, the reference numeral 10 refers in general to an enclosure forming a major portion of a fluidized bed reactor which may be in the form of a boiler, a combustor, a steam generator or any similar type device. The enclosure 10 consists of a front wall 12, a rear wall 14, and two sidewalls, one of which is shown by the reference numeral 16. According to the exemplary embodiment shown, each wall is formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22, is disposed within the enclosure 10 and rests on a perforated plate, or grate, 24 extending horizontally in the lower portion of the enclosure. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and is divided into four chambers 26a, 26b, 26c and 26d by three pivotal dampers 28a, 28b and 28c mounted in the plenum 26 in the spaced relation shown. An air conduit 30 is connected to a source of pressurized air (not shown). As is apparent from the drawing, the damper 28c controls the flow of air into the chamber 26c, the damper 28b controls the flow of air into the chamber 26b and the damper 28a controls the flow of air into the chamber 26a. The air entering each chamber 26a, 26b, 26c and 26d passes through the perforations in the grate 24 and into the corresponding portions of the bed 22 extending immediately above the chambers for fluidizing the respective bed portions. Thus, selective zonal fluidization of the respective areas of the bed 22 extending above the chambers 26a, 26b and 26c can be achieved by selectively opening and closing the dampers 28a, 28b and 28c and thus controlling the flow of air entering the chambers, for the reasons set forth above.

A plurality of pipes 34, 36 and 38 extend through corresponding openings in the plenum 26 and the plate 24, and into the bed for a height that is approximately equal to the desired height of the bed. An additional pipe 40 extends in a similar manner but terminates at the level of the plate 24. The pipes 34, 36, 38 and 40 are spaced apart in a manner so that they respectively extend in the chambers 26a, 26b, 26c and 26d. A conduit 42 is provided which connects each pipe 34, 36, 38 and 40 to a plurality of additional pipes (not shown) to form four rows of pipes respectively disposed in the chambers 26a, 26b and 26d.

A conduit 44 extends from the air conduit 30 and passes underneath the plenum 26 where it branches into four branch conduits 44a, 44b, 44c and 44d which register with the pipes 34, 36, 38 and 40, respectively, for supplying air to the latter pipes. A valve 46 is disposed in each of the branch conduits 44a, 44b, 44c and 44d for selectively controlling the flow of air through the conduits. Each pipe 34, 36, 38 and 40 has an enlarged truncated head portion 34a, 36a, 38a and 40a mounted on its free end portion. The air thus supplied to the pipes 34, 36, 38 and 40 passes upwardly through the pipes where it discharges from the respective head portion 34a, 36a, 38a and 40a and into the bed 22 as will be described later.

Each head portion 34a, 36a, 38a and 40a serves to both discharge air into the bed 22 and remove particulate material from the bed. To the latter end, a seal valve 48 is disposed in the lower portion of each of the pipes 34, 36, 38 and 40 and controls the flow of particulate material through the pipes. Thus, when the valves 46 are shut off no air passes upwardly through the pipes 34, 36, 38 and 40 and particulate material will collect in the enlarged head portions 34a, 36a, 38a and 40 and pass downwardly in each pipe through the seal valves 48 and out through the lower end of each pipe.

A fan or pump 50 is provided externally of the enclosure 10 and forces air through a supply conduit 52 which branches into four branch conduits 52a, 52b, 52c and 52d which, in turn, are connected to a return conduit 54. The branch conduits 52a, 52b, 52c and 52d register with the bottom ends of the pipes 34, 36, 38 and 40 respectively and thus receive the particulate material from the latter pipes when their respective seal valves 48 are passing material. The particulate material thus collected is transported, via the air passing through the conduits 52a, 52b, 52c and 52d to the return conduit 54. The conduit 54 extends to a feeder pipe 56 mounted through the rear wall 14 for receiving the particulate material and reintroducing it back into the bed 22. Alternatively, the conduit 54 can extend in the manner shown by the dotted lines to a screw cooler, conveyor belt, or the like (not shown).

A valve 58 is disposed in each branch conduit 52a, 52b, 52c and 52d for controlling the flow of air through the latter conduits and thus the flow of particulate material to the return conduit 54.

It is understood that one or more overbed feeders (not shown) extend through one or more of the walls 12, 14 or 16, and receive particulate coal and adsorbent material from inlet ducts or the like (not shown), and are adapted to feed the coal particles onto the upper surface of the bed 22. The feeders can operate by gravity discharge or can be in the form of spreader type feeders or any other similar device.

As a result of the foregoing, air can be selectively discharged from the pipes 34, 36, 38 and 40 to prevent the build-up, or mounding, of particulate material in one or more portions of the bed 22 as needed. For example, assuming that, for the purpose of start-up, the damper 28c associated with the chamber 26d was closed, only that portion of the bed 22 extending above the latter chamber would be fluidized. A bed light-off burner (not shown) would be provided through the rear wall 14 immediately above the plate 24 for initially lighting off the bed portion extending above the chamber 26d and additional particulate material would be selectively introduced to the bed portion from a corresponding feeder. The air passing through the portion of the bed 22 immediately above the chamber 26d would tend to blow a portion of the particulate material in a direction from right-to-left as viewed in the drawing, over onto the other portions of the bed to cause a build-up of the material, as shown by the dashed line. When a predetermined build-up of material occurs, the valves 46 associated with the branch conduits 44a, 44b and 44c are opened and air from the conduit 44 is passed through all three rows of pipes 34, 36 and 38 and into the bed portions immediately above the chambers 26a, 26b and 26c to loosen the accumulated particulate material in these bed portions. The valves 46 can then be closed and the seal valves 48 associated with the pipes 34, 36 and 38 opened so that particulate material collecting in the pipes 34, 36 and 38 can be discharged through the pipes into the return conduit 54 for reinjection into the bed 22 through the feeder pipe 56. This, of course, prevents the build-up of material in the bed 22 during regular operation. Since the bed portion extending above the chamber 26d is fluidized at all times, the pipe 40 functions as a normal bed drain or additional source of fluidizing air depending on the position of the valves 48 and 46, respectively.

A pair of horizontal headers 60, are connected in fluid communication with the tubes 18 forming the front wall 12 and the rear wall 14, respectively, and another pair of horizontal headers 62 are connected in fluid communication with the tubes 18 forming the sidewalls 16. It is understood that headers similar to the headers 60 and 62 are provided in communication with the upper ends of the walls 12, 14 and 16. As a result, a fluid to be heated can be sequentially or simultaneously passed through the walls 12, 14 and 16 to pick up the heat from the fluidized bed in a conventional manner before it is passed to external apparatus for further processing.

It is further understood that variations in the above arrangements can be made without departing from the scope of the invention. For example, the number and specific locations of the pipes 40 as well as the zonal fluidization techniques can be varied as long as the above objectives and results are achieved. Further a bank, or series, of heat exchange tubes can be provided in the enclosure 10 for circulating water in a heat exchange relationship with the bed 22 in a conventional manner.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fluidized bed reactor comprising a housing, grate means supported in said housing and adapted to receive a bed of particulate material at least a portion of which is combustible, means defining an air plenum extending below said grate means, damper means in said air plenum for dividing said plenum into a plurality of chambers and for selectively controlling the passage of air through said chambers and said grate means to selectively fluidize the corresponding portions of said particulate material extending above said chambers, a pipe extending through each chamber and its corresponding bed portion, means associated with each pipe for selectively admitting pressurized air into said pipe for introducing said pressurized air into its corresponding bed portion to loosen the accumulated particulate material in said latter portion, valve means associated with each air admitting means for cutting off the flow of air into its corresponding pipe to permit the pipe to collect the particulate material building up in the corresponding bed portion, and means associated with said pipes for collecting the latter material from said pipes.

2. The reactor of claim 1 wherein one end of each pipe is disposed at a level above the plane of said grate means and the other end of each pipe extends externally of said bed.

3. The reactor of claim 1 wherein said collecting means comprises a piping system registering with each of said pipes.

4. The reactor of claim 1 further comprising valve means in each pipe for controlling the flow of said material from said pipe to said collecting means.

5. The reactor of claim 1 or 3 further comprising means connected to said collecting means for introducing said particulate material back into said bed.

6. The reactor of claim 5 wherein said material introducing means comprises a conduit registering with said piping system and means for blowing air through said conduit to transport said material through said conduit.

7. The reactor of claim 6 further comprising feeder means extending through said housing and connected to said conduit for receiving said particulate material and introducing said material onto the upper surface of said bed.

8. The reactor of claim 2 wherein said pipes extend in a generally vertical direction and said material flows through said pipes by gravity.

* * * * *